Oct. 13, 1953     J. C. OWENS     2,655,172
ANTISIPHONIC AND SOUND-REDUCING VALVE
Filed June 18, 1951     2 Sheets-Sheet 1

INVENTOR.
Jesse C. Owens.
BY Stuart M. Maule
ATTORNEY.

Oct. 13, 1953  J. C. OWENS  2,655,172
ANTISIPHONIC AND SOUND-REDUCING VALVE
Filed June 18, 1951  2 Sheets-Sheet 2

INVENTOR.
BY Jesse C. Owens.
ATTORNEY.

Patented Oct. 13, 1953

2,655,172

UNITED STATES PATENT OFFICE 2,655,172

ANTISIPHONIC AND SOUND-REDUCING VALVE

Jesse C. Owens, Los Angeles, Calif.

Application June 18, 1951, Serial No. 232,125

9 Claims. (Cl. 137—413)

This invention relates to float-actuated valves of the type commonly employed to control the supply of water to toilet tanks.

An object of my present invention is to provide, in a float-actuated control valve of the type indicated, a construction wherein force derived from the pressure of the water within the valve's inlet or service pipe, is relied upon to close the valve when the storage tank is filled to the desired level, and wherein lowering of the float in response to lowering the level of the water within the tank opens a relief valve to release the fluid pressure which holds the main valve to its seat, with the result that the water pressure within the service pipe lifts the valve from its seat, thereby opening the valve and permitting water to flow therepast and into the storage tank to replenish the water stored therein until the consequent rising of the float again effects closing the relief valve so that pressure again will build up behind the main valve until the latter again closes and thereby shuts off the flow of water from the service pipe.

Another object is the provision of an improved construction of the main valve and its associated parts whereby a double seal is established when the main valve is closed, to make the valve doubly dependable in preventing leakage past the main valve after the supply of water within the storage tank has been built up to the desired level.

Another object is to provide improved means for preventing leakage past the stem of the pressure relief valve, which leakage otherwise would be apt to be jetted upwards against the under surface of the storage tank's lid from which it would be apt to drip both into the tank with a consequent undesirable noise as the drops of dripping water strike the surface of the water stored within the tank, and also outside the tank from the lid's edge, creating an undesirable condition of constant wetting of the floor under the tank and in back of the toilet fixture.

A further object of my present invention is to provide an improved anti-siphonic construction meeting the building ordinances enacted and enforced in many communities to assure against reversal of flow of contaminated water from within the storage tank back into the service pipes, as when interruption of water pressure within the latter results in the development of a partial vacuum therein.

Another object is to provide an unusually efficient sound-reducing construction for a valve of the general character described, wherein means are provided for diverting the single stream of water entering the valve's housing at service pressure, and consequently at relatively high velocity, into a plurality of separate streams, the total volumetric flow of which of course equals that of the entering stream but each of which is of so much less quantity that its velocity is greatly reduced, thereby eliminating the hissing and gurgling sounds which accompany the flow of water through restricted orifices and passages, and the entrance at high velocity of a jet of water into a standing body of water such as that within a toilet storage tank.

A further object in this same connection is to provide, in a sound-reducing storage tank inlet valve of the character described, an adjustable feature whereby the different pressures and rates of flow apt to be encountered in the supply service pipes at different localities can be compensated for in such a manner as to permit the valve to accommodate the maximum flow of water without the development of the noises so objectionable in a toilet flushing mechanism over a wide range of variation of service pressures.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Figure 1:
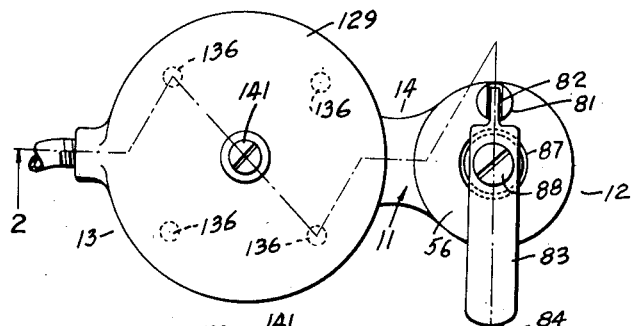
Figure 1 is a top plan view of a sound-reducing and anti-siphonic inlet valve for the storage tank of the flushing mechanism of a toilet, incorporating the principles of the present invention.

Specifically describing the modification of my improved sound-reducing and anti-siphonic storage tank inlet valve which presently is considered preferred, there is provided a housing 11 which consists essentially of two parts 12 and 13, respectively, interconnected by an arm 14 which is hollow to provide a duct 16 which inclines upwardly from the bottom of the housing part 12 to the upper portion of the housing part 13. The part 12 of the housing 11 encloses the main inlet valve and the float-actuated operating parts therefor; whereas the portion 13 of the housing 11 receives water through the duct 16 after its flow thereinto has been permitted by opening of the main inlet valve, and by reducing the velocity of the water thus admitted, substantially reduces or completely eliminates the hissing and gurgling sounds which in more conventional storage tank inlet valves have proven to be so objectionable. The housing part 13 also includes construction to provide highly efficient anti-siphonic features which will be described more in detail as the description progresses hereinbelow.

Referring first to that portion of the valve upon which reliance is placed to control the flow of water from the main service pipe 21, the portion 12 of the housing 11 is of substantially tubular form, its major axis extending vertically. An opening 22 in the bottom of the housing 11, in alignment with this axis, is threaded, as indicated at 23, to receive a tubular sleeve 24, the bore of which is threaded at its lower end to receive the upper end of the service pipe 21. At the upper end of the sleeve 24, a tubular extension or nipple 26 is provided extending upwardly to the interior of the housing portion 12 far enough to dispose an annular valve seat 27 at the top of the nipple 26 above a second valve seat 28 which is provided upon the upper face of an annular flange 29 which defines the lower end of a cylindrical chamber 31 within the housing 12. The inside diameter of the flange 29, and consequently of the valve seat 28 also, is substantially greater that the outside diameter of the nipple 26, thus providing an annular port 32 through which water can flow from the service pipe 21 into the duct 16 upon lifting of the main control valve 33 from the sealing engagement which it is adapted to establish with the valve seat 27.

This main control valve 33 is carried by a plunger 34 which is reciprocable within the cylindrical chamber 31 and which comprises a metal or other rigid core 36 carrying a hydraulic cup 37 of leather, rubber, or similar flexible material, which is mounted upon a neck portion 38 of the core 36 of reduced diameter in such position that its concave side faces upwardly away from the valve 33 which is also carried by the neck 38 of the core 36 below the hydraulic cup 37. The valve 33, which is preferably of suitable resilient material such as rubber, neoprene, or the like, therefore is adapted to be pressed against its seat 27 into closing relationship therewith when hydraulic pressure develops within the chamber 31 above the hydraulic cup 37.

Figure 2:
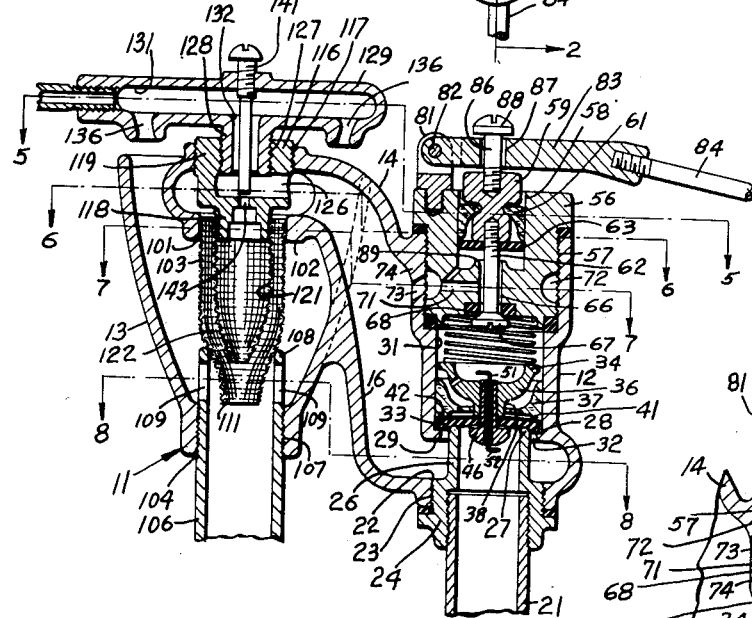
Figure 2 is a compound vertical medial sectional view, the planes of section being indicated by the lines 2—2 of Fig. 1, and the direction of view by the arrows. In this view the main inlet valve is shown in its completely closed position.
Figure 3:
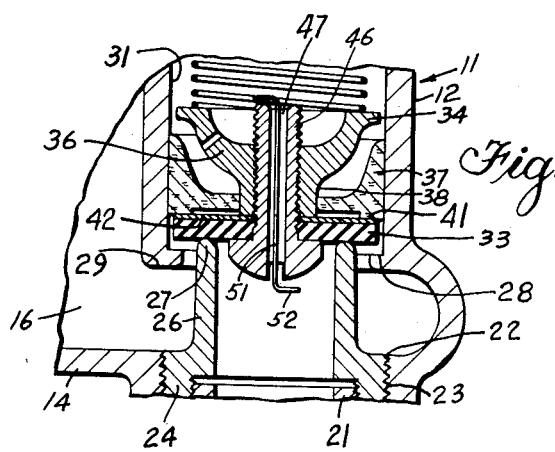
Figure 3 is a highly enlarged detail view of a portion of the structure illustrated in Fig. 2, and showing the main valve in its partially seated position.
Figure 5:
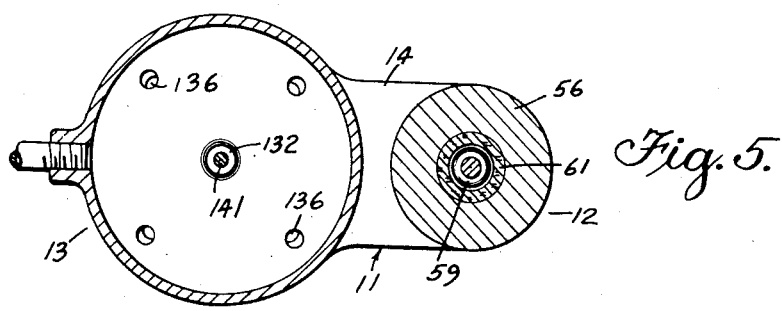
Figure 5 is a compound horizontal sectional view, the planes of section being indicated by the lines 5—5 of Fig. 2, and the direction of view by the arrows.
Figure 6:
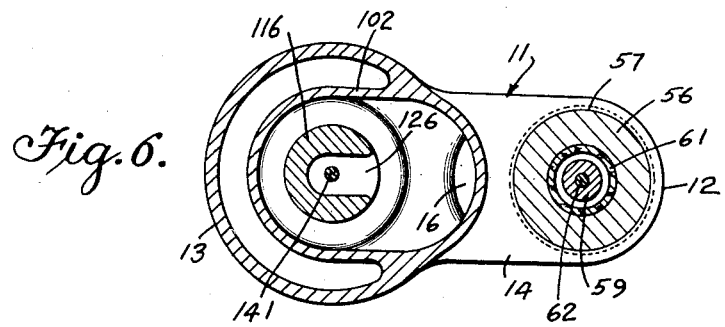
Figure 6 is a compound horizontal sectional view, the planes of section being indicated by the lines 6—6 of Fig. 2 and the direction of view by the arrows.
Figure 7:
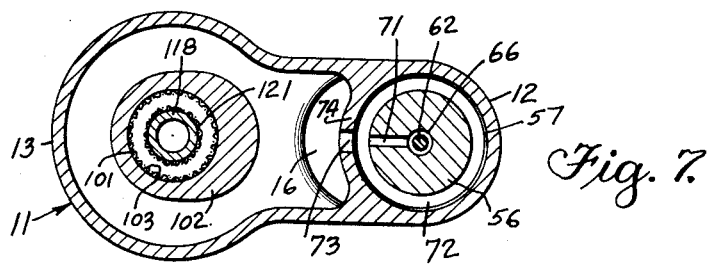
Figure 7 is a compound horizontal sectional view, the planes of section being indicated by the lines 7—7 of Fig. 2 and the direction of view by the arrows.
Figure 8:
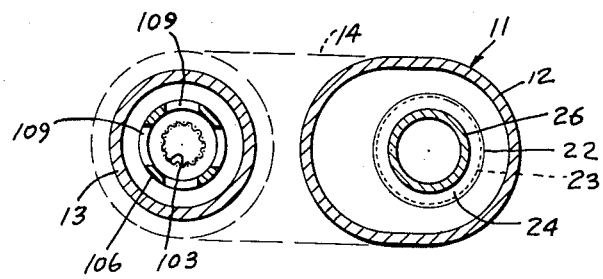
Figure 8 is a compound horizontal sectional view taken upon the lines 8—8 of Fig. 2, with the direction of view as indicated.

Upon that face of the hydraulic cup 37 which is nearer the valve 33, an annular shoulder 41 is provided, the inside diameter of this shoulder being slightly greater than the diameter of the valve seat 27, with the result that when hydraulic pressure behind the cup 37 increases to the extent that the plunger 34 is forced downwards beyond the position in which it is illustrated in Fig. 3, the valve 33 is deflected from its flat, or planar, configuration, as it is illustrated in that figure, and to a configuration wherein it is concave on its under surface. The peripheral edge of the valve 33 is forced downward beyond the position to which the central portion of the valve 33 is moved, this action progressing until the face of the valve 33 adjacent its peripheral edge is pressed into contact with the supplementary valve seat 28, as illustrated in Fig. 2, thereby providing a double seal against leakage of water from the service pipe 21 when the valve is fully closed. Preferably a thin disc 42 of spring brass, or other suitable resilience and preferably non-corrosive material, is interposed between the valve 33 and the plunger 34, as an aid in distributing the pressure which the shoulder 41 of the hydraulic cup 37 exerts, over the portion of the valve 33 which is adjacent its peripheral edge, and also as an aid in enabling the valve 33 to resume its flat, planar configuration when the valve is lifted off its seat 27.

Means are provided for equilibrating the pressures within the service pipe 21 and the interior of the chamber 31 above the plunger 34. The screw 46 whereby the valve 33 and spring disc 42 are secured to the lower end of the neck 38 of the plunger 34, is provided with an axial hole 47 throughout its entire length, thus establishing continuous communication between the interior of the chamber 31 above the plunger 34 and the interior of the service pipe 21 below the plunger. This permits water under pressure within the service pipe 21 to flow upwards through the screw 46, and consequently through the valve 33, disc 42, and plunger 34, so that when the valve 33 is seated, the same pressures will prevail both within the chamber 31 and within the service pipe 21. Inasmuch as the diameter and consequently the area of the upper face of the plunger 34, is substantially greater than the cross-sectional area of the valve seat 27, the total hydraulic pressure exerted on the upper face of the valve 33 will be substantially greater than that which is exerted upwardly thereagainst by water within the nipple 26, with the result that the water pressure prevailing within the supply pipe 21 will operate to press the valve 33 so firmly against both seats 27 and 28 that positive assurance is provided against leakage of water from the service pipe 21 to the interior of the housing 11.

A freely floating wire 51 extends through the hole 47 of the screw 46, both ends of the wire 51 being bent over as indicated at 52 to retain the wire 51 within the hole 47 and yet permit the wire to move freely with respect to the screw. The function of this wire is to prevent the accumulation of sediment within the hole 45 which otherwise might clog the hole 47 and thus interfere with the proper operation of the valve.

The upper end of the cylindrical chamber 31 is closed by a plug 56 threaded into the portion 12 of the housing, as indicated at 57. A recess 58 in the top of this plug 56 slidably accommodates a head 59 and hydraulic cup 61 carried thereby, the concave side of the cup 61 facing downwards so as to prevent upward escape of water from the upper end of the recess 58. A rod 62 threaded axially into the lower end of the head 59 preferably provided with a washer disc 63 fitted to the cylindrical wall of the recess 58 so that both the disc 63 and the hydraulic cup 61 co-operate with each other in preventing water from being jetted upward against the under surface of the tank top.

The rod 62 is actually the stem of the valve extending through a clearance hole 66 in the bottom of the plug 56 so as to dispose the head 67 in position to engage a valve seat 68 mounted in the lower end of the plug 56 and encircling the lower end of the clearance hole 66. Since by lifting, or rather by lowering, the head 67 of the valve from engagement with its seat 68 communication is established between the interior of the chamber 31 and the interior of the duct 16 as will be described hereinbelow, the valve 67 operates as a relief valve, relieving hydraulic pressure within the chamber 31 so that the main control valve 32 can be lifted off its seats 28 and 27 and thus permit water to flow directly from the supplying pipe 21 into the duct 16. The mentioned communication between the chamber 31 and the duct 16 is by way of a radially extending hole 71 from the axial hole 66 to an annular groove 72 in the outer circumference of the plug 56 and into which a hole 73 through a wall 74 of the housing from the duct 16, extends. Consequently, the axial hole 66, the radial hole 71, the annular groove 72, and the small hole 73 co-operate in maintaining the same pressure within the axial hole 66 above the valve head 67 as that prevailing within the duct 16, regardless of the position of rotational adjustment of the plug 56 about its vertical axis with respect to the housing 12.

Figure 4:
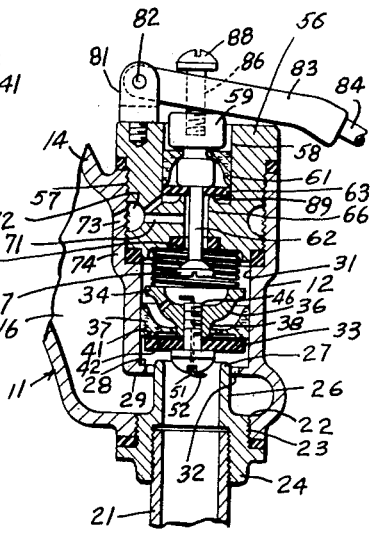
Figure 4 is another detail view drawn to the same scale as Figures 1 and 2, and showing the main inlet valve lifted to its fully opened position.

A lug 81 extending rigidly upward from the top of the plug 56 provides pivotal support, as by a pintle pin 82 for one end of a lever 83 to the other end of which the rod 84 of a conventional toilet tank ball float (not shown) is attached. A screw 86 extends loosely through a clearance hole 87 in the lever 83, there preferably being sufficient space between the under surface of the head 88 of the screw 86 and the top of the head 59 to permit a limited degree of movement of the lever 83 about the axis of its pivot 82, before such motion is imparted to the head 59 and with it the relief valve 67. However, after the motion thus provided for is taken up, continued upward motion of the lever 83 operates to press the relief valve 67 upwardly against its seat 68; or, when such motion of the lever 83 is downwards, after the lost motion has been taken up, the lever 83 will press against the top of the head, as illustrated in Fig. 4, and then cause the relief valve 67 to be moved away from its seat 68. The parts preferably are so proportioned and arranged that when the ball float is in its lowest position, causing the relief valve also to be moved to its lowest position, as illustrated in Fig. 4, the disc 63 will be pressed into sealing engagement with an annular valve seat 89 in the bottom of the recess 58 and encircling the hole 66.

It will be apparent, therefore, that as the level of the water stored within the tank lowers, as when the associated toilet is being flushed, and, as the consequence, the lever 83 moves downwards from its Fig. 2 position towards that in which it is illustrated in Fig. 4, the lever 83 engages the head 59 and forces it inwardly of the recess 58, carrying with it the rod 62 and thus unseating the relief valve 67, as hereinbefore described. As hereinabove explained, this permits relief of the hydraulic pressure within the chamber 31 whereupon the pressure of the water within the service pipe 21 lifts the valve 33 from its seats 28 and 27, as illustrated in Fig. 4. This will permit full flow of water at service pressure from the pipe 21 into the duct 16. As the level of the water in the storage tank approaches its upper limit, the ball float will rise, swinging the lever 83 upwards to its Fig. 2 position, where it will engage the under surface of the head 88 of the screw 86 and thereby throw the head 59 and with it the relief valve 67 upwards until the head 67 of the relief valve closes the lower end of the hole 66. Thereafter the hydraulic pressure within the chamber 31 will build up until it is equal to that within the service pipe 21, with the result that the plunger 34 will be forced downwards, seating the valve 33 first on the valve seat 27 and thereafter on the valve seat 28, establishing the double seal hereinabove described and thereby providing double assurance against leakage of water from the service pipe into the housing of the valve when the storage tank is full.

One of the advantages arising out of the details of construction hereinabove described results from the fact that the rod 84 of the ball float and the lever 83 upon which it is mounted are carried by the plug 56 which is rotatable upon a vertical axis. This permits the lever 83 and rod 84 to extend in any desired direction from the housing 11 as determined by the shape and size of the particular storage tank within any given installation.

The function of the portions of the apparatus associated with the portion 13 of the housing is to receive the water released from the supply pipe 21 by the hereinabove described operation of the main control valve 33, and to reduce the velocity at which that water flows and thereby to permit the water to pass evenly and swiftly into the storage tank so that the noise which accompanies such flow in more conventionally constructed valves is minimized or completely eliminated.

The arm 14 which interconnects the portions 12 and 13 of the housing 11 continues on through the wall of the portion 13 so as to dispose the upper end of the arm 14 within the upper portion of the interior of the part 13 of the housing, substantially centrally thereof. This housing part 13 is in the nature of an open-topped bowl into which water from the main supply valve 33 is delivered through the duct 16, which is continuous throughout the length of the arm 14 so that the water is carried thereby to the upper central portion of the interior of the part 13 of the housing or bowl, as will hereinafter be described.

The principal outlet from the duct 16 into the bowl 13 is through an aperture 101 in the under surface of that portion 102 of the arm 14 which extends radially inside the bowl 13. A tubular screen 103 is fitted at its upper end to the recess 101 from which it depends so that the lower end of the tubular screen 103 is disposed adjacent an outlet opening 104 in the bottom of the bowl 13. To this opening 104 a discharge tube 106 is fitted, as by threads 107, the parts being so arranged, however, that the upper end 108 of the discharge tube 106 extends upwards for a substantial distance beyond the extreme bottom of the bowl 13 and into the interior thereof as is clearly shown in Fig. 2. Preferably a plurality of apertures 109 are provided in the end 108 of the discharge tube 106 so that water can flow from the interior surface of the bowl 13 into the discharge tube 106 even though that water may be outside of the tubular screen 103 the lower end 111 of which is preferably contracted to funnel shape, and which fits within the upper end of the discharge tube 106 above the apertures 109 thereof.

Although the aperture 101 is in the bottom surface of the arm 14, all of the water being delivered to the bowl 13 through the duct 16 does not pass through the aperture 101 because of the fact that that aperture is partially restricted by the lower end of a plug member 116 which is threaded into an aperture 117 in the upper side of the arm 14 in coaxial alignment with the aperture 101. The lower end 118 of this plug 116 is preferably of reduced diameter as compared to the body portion 119 of the plug and depends through the aperture 101 in the under portion of the arm 14. The upper end of a second tubular screen 121 is affixed to this lower end 118 of the plug 116, the parts being so proportioned that the outside diameter of the inner tubular screen 121 is substantially less than the inside diameter of the other tubular screen 103, thus providing for an annular space 122 between the two screens extending vertically throughout their entire length. Consequently, any water escaping from the duct 16 to the interior of the bowl 13 will flow through this space 122, in the form of a sheet of water where its downward progress is so interrupted by the wires of the two screens 103 and 121 that its velocity is very substantially reduced, causing it to flow smoothly and quietly and to be delivered to the discharge tube 106 in such a manner that it flows therethrough to be delivered thereby to the interior of the storage tank without any objectionable noise.

However, owing to the restriction of the orifice 101 which is presented by the end 118 of the plug 116, some of the water being delivered to the bowl 13 by the duct 16 enters a radial passage 126 which is provided in the plug 116 communicating with an axial bore 127 into which the stem 128 of a cap 129 is threaded. The hollow interior 131 of the cap 129 communicates with the passage 126 through the bore 132, thus dividing the water flowing through the duct 116 into at least two streams one of which flows downwards through the aperture 101 between the two screens 103 and 121, and the other of which flows upwards through the bore 132 into the interior 131 of the cap 129.

As is clearly illustrated in Fig. 2, the cap 129 is held by its neck 128 in position elevated above the open upper end of the bowl 13. This assures at all times the maintenance of atmospheric pressure within the bowl 13 and provides positive assurance against development of any partial vacuum within the bowl, even when such relatively low pressure might be developed within the duct 16 as the result of the interruption of the supply of water under suitable service pressure within the supply pipe 21.

That portion of the water entering the portion 13 of the housing by way of the duct 16 which passes upward from the end of the duct 16 to the interior of the cap 129, is directed back into the bowl 13 through the expedient of a plurality of downwardly and inwardly inclined orifices 136 which are provided in the under surface of the cap 129 which preferably is so positioned in its rotational adjustment about the vertical axis of the neck 128 that none of the orifices 136 directs its jet onto the top of the portion 102 of the arm 14. Some of the water thus directed back into the bowl 13 by the orifices 136 will impinge against the outer surface of the tubular screen 103; and some, of course, may strike the inner surface of the bowl 13. However, regardless of these considerations, all of the water directed into the top of the bowl 13 will flow from the bowl through the apertures 109 in the upper end of the discharge tube 106 into the interior of the discharge tube 106 and thus join the water which has passed through the annular passage 122 between the two screens 103 and 121, and thus flow quietly and smoothly through the discharge tube 106 into the storage tank. The number and size of the orifices 136 are such that the water is jetted through them at minimum velocity so as to reduce to a minimum the turbulence of the water thus entering the bowl 13.

A rod 141 is threaded through the top of the cap 129 and extends downwards therefrom through the bore 132 of the stem 128, disposing its lower end closely adjacent an auxiliary port 143 leading through the bottom 118 of the plug 116 from the radial passage 126 into the inner tubular screen 121. It is intended that this auxiliary port 143 may be controlled by means of the screw 141 so that when unusually high pressure conditions obtain within the supply pipe 21, the screw 141 may be lifted away from the auxiliary port 143 and thereby permit still a third stream of water to flow from the duct 116 to the discharge tube 106, and thereby still further reduce the quantity of water that must be handled through the annular space 122 between the screens 103 and 121 and through the orifices 136.

I claim:

1. In a valve assembly for a storage tank, a housing having an inlet port opening thereinto, an annular valve seat encircling said inlet port, means rigid with said housing defining a cylindrical chamber coaxially aligned with said inlet port, a plunger reciprocable within said chamber, a valve on the lower end of said plunger engageable with said valve seat when said plunger is at the end of its stroke nearest said inlet port, said housing having an outlet passage communicating with said inlet port when said valve is removed from said seat, a hydraulic cup carried by said plunger with its concave side facing away from said inlet port, said plunger, cup and valve having a passage therethrough maintaining communication between said inlet port and said chamber on the opposite side of said cup from said inlet port, a plug fitted into the outer end of said chamber and having a pressure relief passage therethrough, a relief valve comprising a stem extending loosely through said relief passage and a valve head on the end of said stem within said chamber, a valve seat carried by said plug encircling said relief passage in position to be engaged by said valve head to close said relief passage as said relief valve moves outwardly with respect to said chamber, and float-operated means for moving said relief valve into engagement with its associated seat.

2. In a valve assembly for a storage tank, a housing having an inlet port opening thereinto, a tubular nipple encircling said inlet port and extending therefrom into said housing, an annular valve seat at the inner end of said nipple, means rigid with said housing defining a cylindrical chamber coaxially aligned with said inlet port, an inwardly extending annular flange on the end of said chamber proximal to said nipple, there being a passage between the outer circumference of said nipple and the inner circumference of said flange and said nipple extending through said flange and thereby positing said valve seat closer to said plunger than the inner face of said flange, a plunger reciprocable within said chamber, a resilient valve on said plunger engageable first with said valve seat and thereafter with said inner face of said flange as said plunger moves toward the end of its stroke nearest said inlet port, and means for forcing said plunger toward said end of its stroke.

3. In a valve assembly for a storage tank, a housing having an inlet port opening thereinto, a tubular nipple encircling said inlet port and extending therefrom into said housing, an annular valve seat at the inner end of said nipple, means rigid with said housing defining a cylindrical chamber coaxially aligned with said inlet port, an inwardly extending annular flange on the end of said chamber proximal to said nipple, there being a passage between the outer circumference of said nipple and the inner circumference of said flange and said nipple extending through said flange and thereby positing said valve seat closer to said plunger than the inner face of said flange, a plunger reciprocable within said chamber, a resilient valve on said plunger engageable first with said valve seat and thereafter with said inner face of said flange as said plunger moves toward the end of its stroke nearest said inlet port, a resilient disc interposed between said plunger and said valve, and means for forcing said plunger toward said end of its stroke, both said disc and said valve being sufficiently flexible to bend subsequently to engagement of said valve with said valve seat and thereby effect engagement of said valve with said inner face of said flange.

4. In a valve assembly for a storage tank, a housing having an inlet port opening thereinto, a tubular nipple encircling said inlet port and extending therefrom into said housing, an annular valve seat at the inner end of said nipple, means rigid with said housing defining a cylindrical chamber coaxially aligned with said inlet port, an inwardly extending annular flange on the end of said chamber proximal to said nipple, there being a passage between the outer circumference of said nipple and the inner circumference of said flange and said nipple extending through said flange and thereby positing said valve seat closer to said plunger than the inner face of said flange, a plunger reciprocable within said chamber, a valve carried by said plunger in co-operative association with said valve seat, a hydraulic cup carried by said plunger with its concave side facing away from said inlet port, there being a passage through the plunger and cup maintaining communication between said inlet port and said chamber on the opposite side of said cup from said port whereby fluid pressure within said chamber is equilibrated with that within said inlet port after said port is closed by said valve, said cup being sufficiently flexible to establish a fluid tight seal with said inner face of said flange subsequently to establishment of a seal with said valve seat, and means for relieving fluid pressure within said chamber and thereby permitting pressure of fluid within said inlet port to move said cup away from said flange and valve seat.

5. In a valve assembly for a storage tank, a housing having an inlet port opening thereinto, a tubular nipple encircling said inlet port and extending therefrom into said housing, an annular valve seat at the inner end of said nipple, means rigid with said housing defining a cylindrical chamber coaxially aligned with said inlet port, an inwardly extending annular flange on the end of said chamber proximal to said nipple, there being a passage between the outer circumference of said nipple and the inner circumference of said flange and said nipple extending through said flange and thereby positing said valve seat closer to said plunger than the inner face of said flange, a plunger reciprocable within said chamber, a hydraulic cup carried by said plunger with its concave side facing away from said inlet port, a resilient valve carried by said plunger between said cup and said inlet port, there being a passage through said plunger, cup, and valve maintaining communication between said inlet port and said chamber on the opposite side of said cup from said inlet port, said cup and valve being sufficiently flexible for said valve to engage the inner face of said flange subsequently to its engagement with said valve seat as said plunger moves toward said inlet port, and means for relieving fluid pressure within said chamber and thereby permitting pressure of fluid within said inlet port to move said cup and valve away from said flange and valve seat.

6. In a valve assembly for a storage tank, a housing having an inlet port opening thereinto, a tubular nipple encircling said inlet port and extending therefrom into said housing, an annular valve seat at the inner end of said nipple, means rigid with said housing defining a cylindrical chamber coaxially aligned with said inlet port, an inwardly extending annular flange on the end of said chamber proximal to said nipple, there being a passage between the outer circumference of said nipple and the inner circumference of said flange and said nipple extending through said flange and thereby positing said valve seat closer to said plunger than the inner face of said flange, a plunger reciprocable within said chamber, a hydraulic cup carried by said plunger with its concave side facing away from said inlet port, a resilient valve carried by said plunger between said cup and said inlet port, a disc-shaped spring carried by said plunger between said cup and said valve, there being a passage through said plunger, cup, valve, and spring maintaining communication between said inlet port and said chamber on the opposite side of said cup from said inlet port, said cup, valve, and spring being sufficiently flexible for said valve to engage the inner face of said flange subsequently to its engagement with said valve seat as said plunger moves toward said inlet port, and means for relieving fluid pressure within said chamber and thereby permitting pressure of fluid within said inlet port to move said cup and valve away from said flange and valve seat.

7. In a valve assembly for a storage tank, a housing having an inlet port opening thereinto, a tubular nipple encircling said inlet port and extending therefrom into said housing, an annular valve seat at the inner end of said nipple, means rigid with said housing defining a cylindrical chamber coaxially aligned with said inlet port, an inwardly extending annular flange on the end of said chamber proximal to said nipple, there being a passage between the outer circumference of said nipple and the inner circumference of said flange and said nipple extending through said flange and thereby positing said valve seat closer to said plunger than the inner face of said flange, a plunger reciprocable within said chamber, a hydraulic cup carried by said plunger with its concave side facing away from said inlet port, a resilient valve carried by said plunger between said cup and said inlet port, a disc-shaped spring carried by said plunger between said cup and said valve, there being a passage through said plunger, cup, valve, and spring maintaining communication between said inlet port and said chamber on the opposite side of said cup from said inlet port, said cup, valve, and spring being sufficiently flexible for said valve to engage the inner face of said flange subsequently to its engagement with said valve seat as said plunger moves toward said inlet port, an annulus of inside diameter greater than the diameter of said valve seat interposed between said cup and said spring whereby pressure exerted by said cup is imposed on said spring adjacent the spring's peripheral edge and in line with said flange, and means for relieving fluid pressure within said chamber and thereby permitting pressure of fluid within said inlet port to move said cup and valve away from said flange and valve seat.

8. In a valve assembly for a storage tank, a housing having an inlet port opening thereinto, an annular valve seat encircling said inlet port, means rigid with said housing defining a cylindrical chamber coaxially aligned with said inlet port, a plunger reciprocable within said chamber, a resilient valve on the lower end of said plunger engageable with said valve seat when said plunger is at the end of its stroke nearest said inlet port, said housing having an outlet passage communicating with said inlet port when said valve is removed from said seat, a hydraulic cup carried by said plunger with its concave side facing away from said inlet port, said plunger, cup and valve having a passage therethrough maintaining communication between said inlet port and said chamber on the opposite side of said cup from said inlet port, a plug fitted into the outer end of said chamber and having a pressure relief passage therethrough, a relief valve comprising a stem extending loosely through said relief passage and a valve head on the end of said stem within said chamber, a valve seat carried by said plug encircling said relief passage in position to be engaged by said valve head to close said relief passage as said relief valve moves outwardly with respect to said chamber, said plug having an annular groove in its circumferential surface and a radial hole from said relief passage to said groove and said housing having a hole through a wall of said chamber from said groove into said housing's outlet passage, and float-operated means for moving said relief valve into engagement with its associated seat.

9. In a valve assembly for a storage tank, a housing having an inlet port opening thereinto, an annular valve seat encircling said inlet port, means rigid with said housing defining a cylindrical chamber coaxially aligned with said inlet port, a plunger reciprocable within said chamber, a resilient valve on the lower end of said plunger engageable with said valve seat when said plunger is at the end of its stroke nearest said inlet port, said housing having an outlet passage communicating with said inlet port when said valve is removed from said seat, a hydraulic cup carried by said plunger with its concave side facing away from said inlet port, said plunger, cup and valve having a passage therethrough maintaining communication between said inlet port and said chamber on the opposite side of said cup from said inlet port, a plug fitted into the outer end of said chamber and having a pressure relief passage therethrough, a relief valve comprising a stem extending loosely through said relief passage and a valve head on the end of said stem within said chamber, a valve seat carried by said plug encircling said relief passage in position to be engaged by said valve head to close said relief passage as said relief valve moves outwardly with respect to said chamber, said plug having an annular groove in its circumferential surface and a radial hole from said relief passage to said groove and said housing having a hole through a wall of said chamber from said groove into said housing's outlet passage, a float-operated means for moving said relief valve into engagement with its associated seat, said plug having a cylindrical recess in its outer end into which said valve stem extends, a head disposed at least partially within said recess and engaged with said stem, a valve seat encircling the outer end of said relief passage within said recess, a valve disc fitted within said recess and carried by said valve stem in position to be pressed against said seat within said recess by said head when said valve head is unseated, a hydraulic cup fitted to said recess and carried by said head with its concave side facing said relief passage, and a float-actuated lever pivotally mounted on said housing in position extending across the outer end of said recess and engageable with said head to unseat said relief valve.

JESSE C. OWENS.

References Cited in the file of this patent

UNITED STATES PATENTS

| Number | Name | Date |
|---|---|---|
| 802,330 | Schulze | Oct. 17, 1905 |
| 1,160,441 | Packer | Nov. 16, 1915 |
| 2,283,973 | Criss | May 26, 1942 |
| 2,480,712 | Carbon | Aug. 30, 1949 |
| 2,581,043 | Owens | Jan. 1, 1952 |
| 2,608,991 | Crockett | Sept. 2, 1952 |